UNITED STATES PATENT OFFICE.

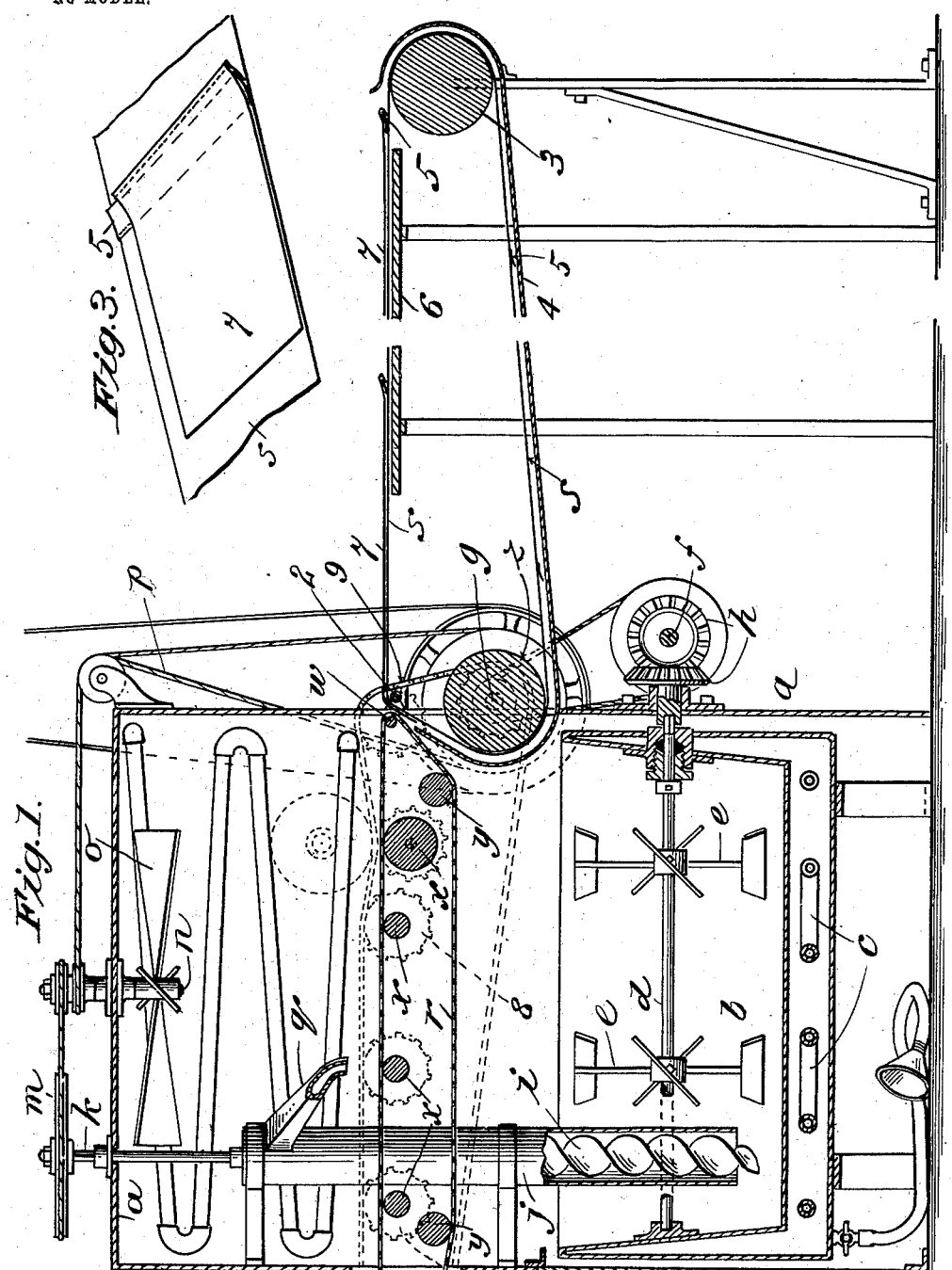

GABRIEL CARLSON, OF SPRINGFIELD, MASSACHUSETTS.

CONFECTIONERY-COATING MACHINE.

SPECIFICATION forming part of Letters Patent No. 717,970, dated January 6, 1903.

Application filed May 19, 1902. Serial No. 108,046. (No model.)

*To all whom it may concern:*

Be it known that I, GABRIEL CARLSON, a citizen of the United States of America, residing at Springfield, in the county of Hampden and State of Massachusetts, have invented new and useful Improvements in Confectionery-Coating Machines, of which the following is a specification.

This invention relates to machines for coating confectionery, and is especially adapted for coating of confections with chocolate, and has for its object the provision of a machine of this class whereby the blanks to be coated may be more thoroughly coated, especially as regards the under side thereof, a further object of the invention being to provide means whereby in a machine of this class the coated confections may be removed from the delivery-apron without subjecting them to any handling and without permitting them to drop off from the delivery-apron into a receptacle provided for that purpose.

In the drawings forming part of this application, Figure 1 is a sectional elevation taken lengthwise through the machine in which this invention is embodied. Fig. 2 is a perspective view of a portion of the flexible conveyer-grating on which the confections are conveyed through the part of the machine in which the coating is effected. Fig. 3 is a perspective view of a portion of the delivery-apron.

In chocolate-coating machines as heretofore constructed commercial use has developed certain disadvantages. Of these one is that it has been found difficult to properly coat the under side of the confection-blanks with the chocolate, and the second disadvantage referred to is that the time required to properly effect the hardening of the coating has necessitated the use of a very long delivery-apron, whereby time might be given to permit this coating to become hard, and it has also necessitated the use of artificially-cooled chambers, through which the delivery-apron is made to travel, all of which make the requirements for room for these machines quite disproportionate to their capacity as to product. These two disadvantages have been overcome in the machine which forms the subject of this application, the construction of which may be readily understood by reference to the accompanying drawings and the following specification.

In carrying out my invention I construct on a suitable frame the casing $a$, of metal, in the lower part of which there is a chocolate mixing and heating receptacle $b$, having double walls and a double bottom between which water is contained which may be heated by the steam-pipes $c$. Within this receptacle $b$ there is a horizontal shaft $d$, on which are located the paddles $e$, the shaft $d$ being rotated by a shaft $f$, supported on the back side of the casing and driven by a cord or belt from the main driving-shaft $g$ of the machine. Suitable beveled-gear connections between the shafts $f$ and the shaft $d$ are provided, and indicated herein by $h$. Extending to the chocolate-receptacle $b$ there is a vertically-disposed screw conveyer $i$, inclosed within a tube $j$.

Suitably supported within the casing $a$ and from the upper end of said conveyer $i$ a shaft $k$ extends through said casing and has fixed thereon a pulley $m$. Within the upper part of said casing there is supported on a short shaft $n$, extending downwardly through the top thereof, a fan $o$, which is driven by a cord or belt $p$, running over a suitable pulley on the main driving-shaft $g$ and another pulley on the upper end of said shaft $n$, the screw conveyer $i$ being driven also by a belt running from this shaft $n$ to the pulley $m$ on the shaft $k$. The upper end of the tube $j$ is provided with a spout $q$, having a flaring nozzle, whereby the chocolate may be run in a very thin stream down onto the horizontally-disposed flexible conveyer $r$ within the casing $a$, whereby the confectionery-blanks to be coated may be carried through this casing under the aforesaid thin stream of chocolate and after passing through the casing be deposited on a delivery-apron, (indicated by $s$.) This horizontally-disposed flexible conveyer $r$ and the delivery-apron $s$ do not *per se* constitute any part of this invention, as both of these devices are well known and are disclosed, for example, in the patent to E. P. F. Magniez, dated August 13, 1901, No. 680,489; but this invention runs particularly to the manner of constructing this flexible conveyer and the manner of constructing the flexible delivery-apron and to their coöperative relation, all as hereinafter described.

Referring first to the flexible conveyer r, it may be said that the problem of finding a suitable conveyer mechanism whereby the confections may be carried through the machine under a stream of chocolate and every part of the confections suitably coated has been a very difficult one, and while certain types of conveyers will answer for small pieces they may be totally unsuitable for pieces having a relatively large base, the consequence being that the under side of the confections will not be properly coated—either not coated at all in spots or covered with such a thin layer that the blank may be seen, and thus make them undesirable from a commercial point of view.

Where confections having bases of considerable area are to be coated, it is necessary in order to attain the best results to support these confections in such a manner that as small a portion of said bases shall be in contact with the supporting devices as possible and to provide rolls located under the conveyer in contact with the under side thereof, whereby the chocolate may be spread by these rolls on the under side of the confections.

Heretofore a flexible conveyer device has been constructed by using a number of parallel threads running over rolls through the machine; but these prove unsatisfactory as a conveyer on account of their unstable character and liability to breakage, the breaking of a thread causing great annoyance and damage by becoming tangled with other threads and wound upon the rolls before the accident is discovered and the machine stopped. The principal objection, however, to this form of conveyer lies in the fact that because of the unstable nature of the construction the product is not uniform.

By the construction of a flexible conveyer, as shown herein, I have succeeded in overcoming the defects existing in prior constructions and have provided a conveyer which may be subjected to sufficient tension to keep it level without any danger of breakage and one which presents no more contact-surface with the under side of the confections than do the parallel threads referred to, and it is of a form which permits the distributing-rolls underneath the conveyer to spread the chocolate mixture over the under side of the confections in a manner entirely satisfactory. This conveyer consists in supporting a number of fine metal wires, preferably of steel "piano-wire," so called, between two side strips u of flexible material, preferably a strip of canvas or heavy tape. The wires t are secured by their ends to these edge strips u in any suitable manner. The ends of the wires may be flattened and stitched into pockets made by folding the edge strips over to inclose the ends of the wires, or the ends of the latter may be bent at right angles to their length and stitched in in that way or in any other manner whereby they may be held in their relative parallel positions at right angles to the direction of movement of the conveyer through the machine. This conveyer is made of such length that one end thereof may extend out through the side of the casing a far enough to permit the confection-blanks to be placed thereon by the operator. The outer end of this conveyer is supported on a roll v, carried on a suitable bracket. The opposite end runs over a small roll w, and between these two are the rolls x, which serve the double purpose of partially supporting the conveyer, maintaining it in a horizontal plane, and acting as distributing-rolls, whereby the chocolate mixture may be applied to the under side of the confection. Other rolls y, located below the rolls x, are bearing-rolls. Any suitable means may be employed for placing this conveyer r under endwise tension.

It will be observed that the roll w, over which the conveyer runs at one end thereof is of very small diameter, this construction being necessary in order that there may be no wide break between this end of the conveyer and the contiguous end of the delivery-apron s, and the construction of the flexible conveyer above described is such that it is possible to run it over a roll having this small diameter. The delivery-apron s is supported on a roll z on the shaft g and is driven thereby. From this roll it runs up over a small roll 2 close to the roll w and from thence over a roll 3, supported on a suitable standard in such position that said apron will travel in the same horizontal plane as the conveyer r. This apron may be made of any suitable material having the required flexibility. Generally, however, it is made of enameled cloth.

Extending partially around the roll 3 there is a metal guard 4, which is carried in parallelism with the delivery-apron s back to and partially around the roll z, there being a slight space left between the surface of the roll and the interior surface of said guard.

At regular intervals there is sewed to the delivery-apron a transversely-disposed strip 5, the rearward edge of which is stitched or otherwise secured to the apron, leaving the forward edge free. This strip may be of any suitable material which has the necessary rigidity to keep it from being easily turned backward upon itself. In the drawings the proportions thereof relative to the delivery-apron are somewhat exaggerated for the sake of clearness.

Between the two rolls z and 3 there is a table 6, over the surface of which the apron s runs. Engaging with these strips 5 on the apron are the flexible sheets 7, the forward edges of which are turned back underneath the sheet, thus forming a pocket with which the edge of the strip 5 on the apron may engage. In practice all these parts are so made that the forward end of the sheet 7 will lie close against the surface of the apron. The length of the sheets 7 is such that when the forward end thereof is engaged with one of the strips 5 the other end will be located close to the next succeeding strip 5. It is thus seen that this construction provides a delivery-apron whose upper surface consists of separated sheets, which may be removed from the apron by sliding them sidewise off of the latter onto a table, as 6, and constitute a covering for the apron, which is removable in sections.

The guard 4 is for the purpose of holding the sheets 7 in engagement with the apron $s$ during the passage of the latter beneath the rolls 3 and $z$ and for properly guiding the forward end of said sheet past the end of the conveyer $r$. This delivery-apron construction overcomes one of the disadvantages of this type of machine as heretofore constructed by making it possible to take care of the product of the machine without handling the same or without permitting the same to drop into any receptacle from the delivery end of the apron $s$, and the manner of operating this delivery-apron and its removable sheets is as follows: An operator stands near the table 6, and as the sheets 7 pass over said table they are pushed sidewise off onto one end of the table and an empty sheet slid onto the apron from the other side and into the place formerly occupied by said removed sheet, care being taken to engage each sheet with its proper strip 5. The filled sheets removed from the delivery-apron may then be slid off onto a thin board or tray and put up in racks to thoroughly harden before being packed. It is possible that these sheets may be made of some material—as, for example, thin brass, aluminium, or celluloid—which possesses the required flexibility to pass around the rolls supporting the apron and yet sufficient rigidity to permit them to be handled without the use of a board or tray. Furthermore, it permits different kinds of confections to be coated in the machine without mixing the product. This method of caring for the product of the machine of this type removes one of the serious disadvantages which have pertained to all machines of this class as heretofore constructed within my knowledge. Suitable movement in the proper direction is imparted to the conveyer $r$ by mounting on the end of the roll on which this conveyer is carried sprocket-wheels (indicated by 8 and shown only in dotted lines) and mounting on the shaft $g$ another sprocket-wheel (also shown only in dotted lines in said Fig. 1) and running a sprocket-chain 9 over these sprockets in engagement with the upper side thereof and with the under side of the driving-sprocket on the shaft $g$.

As heretofore stated, the rolls $x$ not only serve as supports for the conveyer $i$, but they become covered with chocolate and thereafter serve as means for applying the chocolate to the under side of the confections as the latter pass over these rolls. It will be observed that the speed of rotation of these rolls is the same as the speed of rotation of the end rolls $v$ and $w$, and therefore the application of the chocolate to the under side of the confections is by simple contact, there being no wiping movement, which would be produced by a difference in speed between the conveyer and the surface speed of the roll.

Whenever in the specification the word "apron" has been used, it is to be understood that it has been used in its broadest sense and that a moving conveyer device is intended to be designated thereby and that I do not wish to be understood as restricting myself specifically to an apron.

Having thus described my invention, what I claim, and desire to secure by Letters Patent of the United States, is—

1. A coating-machine for confections consisting of a receptacle for the coating material, a conveyer device for carrying the confections to be coated composed of wires secured by their ends to strips of flexible material, rolls for supporting the conveyer device, means for imparting movement to said device through the machine, together with means for effecting the flow of coating material from said receptacle onto said conveyer device.

2. A coating-machine for confections consisting of a receptacle for the coating material, a conveyer device for carrying the confections, rolls for supporting the conveyer device, means for drenching the confections on said device with coating material, and a delivery-apron for receiving the coated confections from the conveyer device, said apron consisting of separately-removable sections, whereby the confections may be removed from the apron without being disturbed.

3. In a machine for coating confections, the following instrumentalities: a conveyer device, a receptacle for the coating material, means for directing a stream of said material onto said conveyer device, and a delivery mechanism for the machine composed of separable sections on which the confections may be deposited from the conveyer device by the operation of the machine, whereby said confections may be removed without being disturbed.

4. A coating-machine for confections consisting of a receptacle for the coating material, a conveyer device horizontally located over said receptacle, an elevating device for raising the material in said receptacle to a point above the conveyer device whereby the material may flow upon said device; means for moving the latter through the machine, and a delivery mechanism consisting of a movable apron, and sheets of material removably engaging said apron, upon which sheets the coated confections may be deposited from the conveyer device.

5. In a confectionery-coating machine, suitable coating devices and a delivery mechanism consisting of separable confection-receiving sections, a movable apron, and means for removably engaging the said sections and apron.

6. In a confectionery-coating machine, suitable coating devices and a delivery mechanism consisting of separable confection-receiving sections, a movable apron, and means for removably engaging said sections and apron, and a guard for said apron for preventing the disengagement of said sections from said apron.

7. In a machine for coating confections, the following instrumentalities: a conveyer device, a receptacle for the coating material, means for covering the confections with said material, and a delivery mechanism for the machine composed of separable sections on which the confections may be deposited from the conveyer device by the operation of the machine, whereby said confections may be removed without being disturbed.

GABRIEL CARLSON.

Witnesses:
WM. H. CHAPIN,
K. I. CLEMONS.